July 19, 1960  M. PETTY  2,945,262
METHOD OF FORMING HOLLOW REINFORCED PLASTIC BODIES
Filed Aug. 23, 1955  3 Sheets-Sheet 1
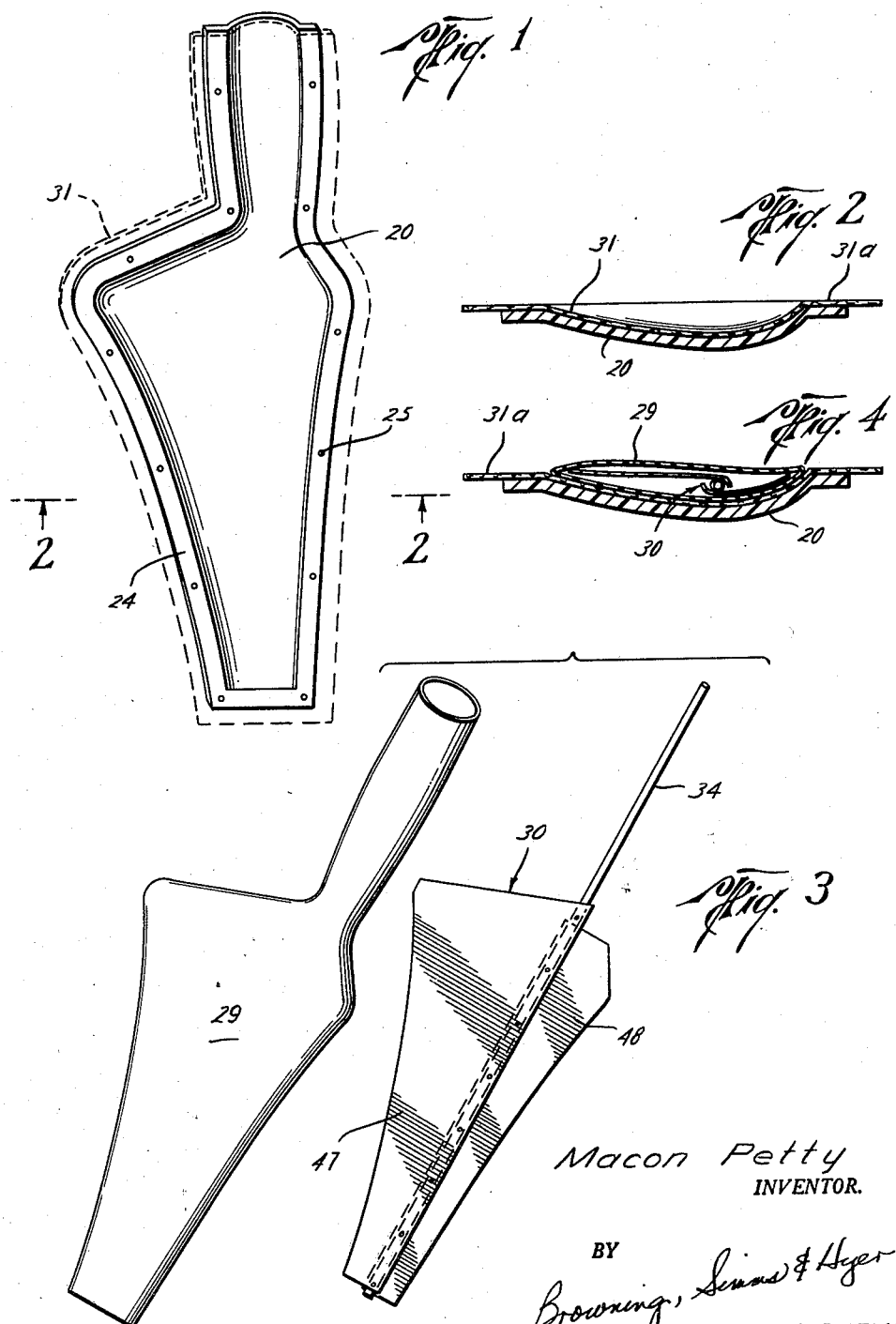
Macon Petty
INVENTOR.
BY
ATTORNEYS

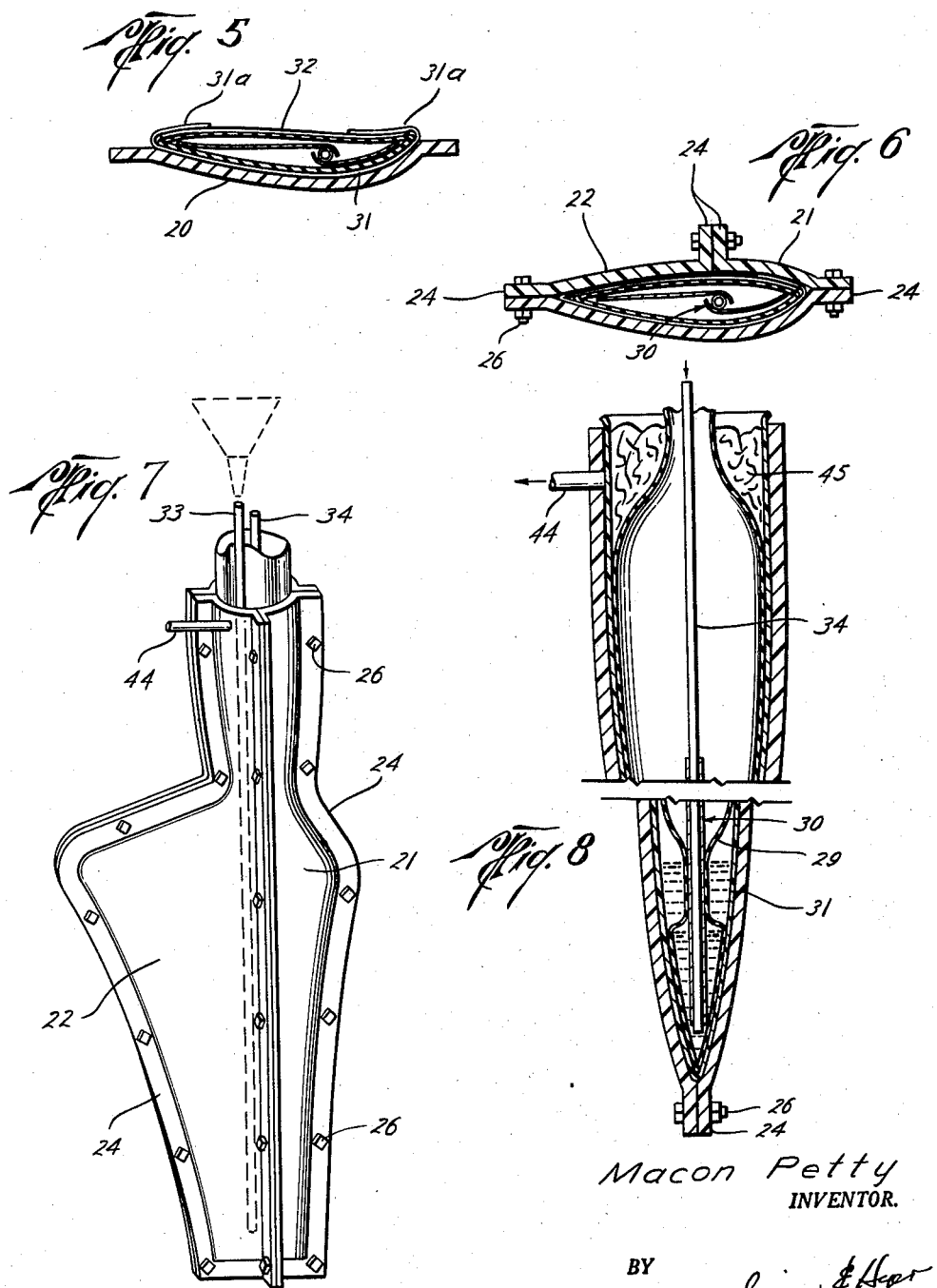

July 19, 1960
M. PETTY
2,945,262
METHOD OF FORMING HOLLOW REINFORCED PLASTIC BODIES
Filed Aug. 23, 1955
3 Sheets-Sheet 3
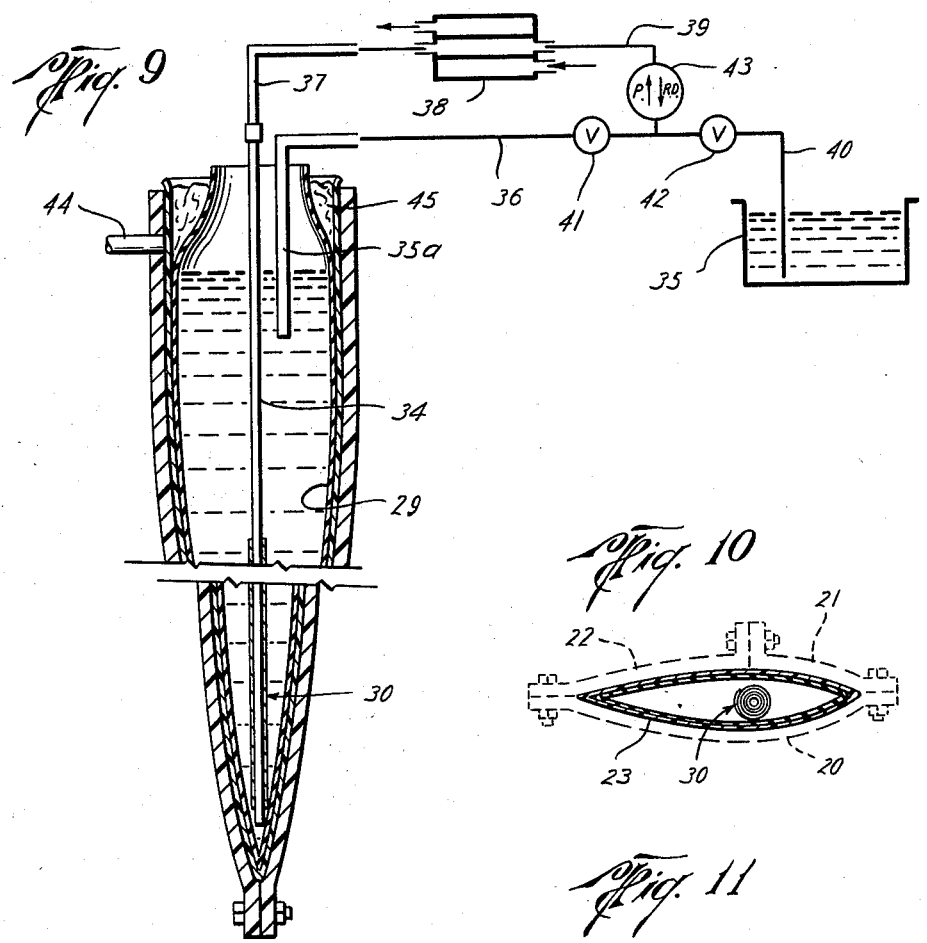
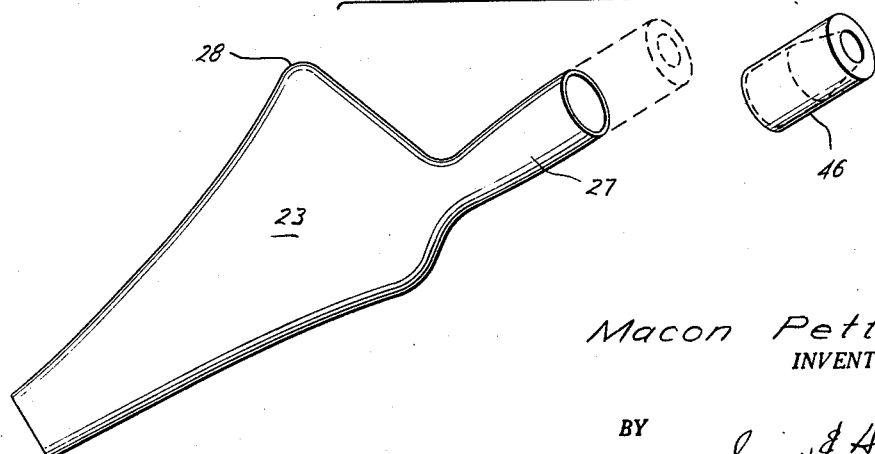
Macon Petty
INVENTOR.
BY
Browning, Simmons & Ager
ATTORNEYS

United States Patent Office 2,945,262
Patented July 19, 1960

2,945,262

METHOD OF FORMING HOLLOW REINFORCED PLASTIC BODIES

Macon Petty, Houston, Tex., assignor to Hudson Engineering Corporation, Houston, Tex., a corporation of Texas Filed Aug. 23, 1955, Ser. No. 529,977

8 Claims. (Cl. 18—55)

This invention relates to an improved method of molding reinforced plastic bodies such as thin-necked hollow bodies, fan blades or the like.

Large fan blades which are adapted to be rotated at high speeds should be of light weight, inexpensive manufacture, and resistant to erosion by moisture, dust, sand, etc. Also, such blades should provide a smooth permanent finish to prevent accumulation of extraneous matter thereon which would lower their efficiency, and still further should be attachable to a hub in a manner to permit pitch adjustment.

Although hollow fan blades molded as integral bodies of reinforced plastic material have been found to meet most of these requirements, it has not been possible according to known practices to form such blades with the desired strength for many uses. As in the case of molding reinforced plastic bodies of other shapes, difficulty has been encountered in obtaining thorough impregnation of the reinforcement with the plastic material. That is, the prior art has not solved the problem caused by the trapping of air bubbles within the body during impregnation. The problem is still more acute in the molding of hollow bodies such as fan blades having leading and trailing edges which are inherently resistant to thorough impregnation.

An object of htis invention is to provide a method of molding reinforced plastic bodies, and, more particularly, hollow bodies, which enables a more thorough impregnation of the reinforcement with plastic material than has heretofore been possible.

Another object is to provide a method of this type wherein the plastic material is caused to impregnate the reinforcement in a manner to permit air bubbles to escape therefrom.

Still another object is to provide a molding method of the character described in which the plastic material may be maintained at the proper viscosity for impregnating the reinforcement and permitting the escape of air bubbles therefrom by controlling the temperature of a pressure medium for causing such impregnation.

Still a further object is to provide such a molding method wherein the rate of impregnation of reinforcement with plastic material may be so controlled as to permit the escape of air bubbles therefrom.

Yet another object is to provide a molding method of this type wherein a pressure medium is impressed upon reinforcement and the plastic material contained within an annular space in a manner to cause impregnation of the reinforcement progressively from the lower to the upper end of the annular space such that air bubbles are permitted to escape upwardly therefrom.

A still further object is to provide a method of the character described in the foregoing object in which the pressure medium may be a liquid metallic substance having a high specific gravity, and wherein compensation may be made for excessive pressure on the plastic material in the lower end of the annular space due to the rising level of such substance.

Yet a further object is to provide a method as described in the foregoing object in which such compensation is accomplished by the maintenance of plastic material at such a temperature during the impregnation that a portion thereof beneath the rising level of pressure medium is caused to harden.

Another object is to provide a method of molding thin-necked bodies within an annular space between an outer mold member and an inner mold member which is expandable within the outer mold into substantially the shape of the interior of the body to be formed, but flexible in a manner to permit removal from the thin-neck of the formed body.

Yet another object is to provide a method of the type described in the foregoing object in which the inner mold member may be further expanded by the exertion of forces upon opposite edges thereof for use in molding bodies having inner and outer leading and trailing edges.

A still further object is to provide a method of molding hollow reinforced plastic bodies which eliminates the need for heating coils or the like in the outer mold member and, more particularly, which permits the use of a relatively inexpensive reinforced plastic outer mold member.

Still another object is to provide a method of the type described in which reinforcement and a plastic material in excess of that required to impregnate the reinforcement are molded within an annular space in such a manner that air bubbles are permitted to escape into such excess which may be removed from the formed body.

A still further object is to provide a method of using an inner mold member adapted to be filled with a pressure medium in the molding of hollow reinforced plastic objects having restricted neck portions, which mold member is expandable within an outer mold member prior to filling into substantially the shape of the interior of the object to be formed and flexible to permit removal in its original form through the restricted neck portion of the molded object.

Another object is to provide a method of using an inner mold member of the character described in the foregoing object for use in molding such objects having leading and trailing edges, in which a means for so expanding the mold member is operable to exert forces upon opposite edges thereof for promoting impregnation of the reinforcement by the plastic material contained between the inner and outer mold members at the leading and trailing edges of the object.

A still further object is to provide a method of using a device for expanding a flexible bag having a restricted neck portion, which device is manipulatable from the exterior of the bag to a retracted position to permit its removal through such restricted neck portion.

Other objects, advantages and features of this invention will be apparent to one skilled in the art upon a consideration of the written specification, the attached claims and the annexed drawings.

In the drawings, wherein like reference characters are used throughout to designate like parts:

Fig. 1 is a view of a section of an outer mold member, with a layer of reinforcing material shown in phantom disposed within the inner cavity of the section;

Fig. 2 is a cross-sectional view of the mold member section taken substantially along line 2—2 of Fig. 1 and showing the layer of reinforcing material in solid lines;

Fig. 3 is an exploded view of parts of an inner mold member, including a flexible bag and a mandrel for expanding the bag;

Fig. 4 is a view similar to Fig. 2, but with the inner mold member disposed on the layer of reinforcing material within the outer mold member section;

Fig. 5 is view similar to Fig. 4, but with an additional layer of reinforcing material laid above the inner mold member and partially covered by overlapping edges of the lower layer;

Fig. 6 is still another cross-sectional view of the outer mold member section, but with the other sections of the outer mold member attached thereto for confining the reinforcing material in the annular space between the inner and outer mold members;

Fig. 7 is a perspective view of the mold members mounted in an upright position and with the plastic material being added to the annular space;

Fig. 8 is a vertical cross-sectional view of the upright mold members with the inner member being filled with a pressure medium for expanding the same and causing the plastic material to impregnate the reinforcement;

Fig. 9 is a view similar to Fig. 8 wherein the inner mold member has been filled to fully impregnate the reinforcement, and illustrating diagrammatically apparatus for directly controlling the temperature of the pressure medium within the inner mold member;

Fig. 10 is a horizontal cross-sectional view of the molded body prior to removal of the inner mold member therefrom, with the outer mold member which has been removed shown in phantom; and Fig. 11 is an exploded view of the molded body and a portion of the neck thereof which has been removed.

In accordance with the present invention, there is provided a method of forming a reinforced plastic body in which the reinforcement and plastic material are contained within a space between a flexible and a relatively rigid mold member, and a pressure medium is caused to be impressed upon the flexible mold member to impregnate the reinforcement with the plastic material progressively from one end of the space to the other. During such impression, the viscosity of the plastic material as well as the rate of impression are so controlled as to remove air bubbles from within the reinforcement. That is, the temperature of the plastic material is maintained at a level to render it sufficiently liquid to not only impregnate the reinforcement but also to permit air bubbles to escape toward said other end of the space. The amount of plastic material contained within the space may be in excess of that required to impregnate the reinforcement, the air bubbles forced into the excess in the molded body, and such excess then removed.

The pressure medium is hydraulic, and preferably a liquid metallic substance having a high specific gravity and a low melting point, the temperature of which may be controlled to in turn maintain the tempertature of the plastic material at the desired level. Thus, the pressure medium is applied to the flexible mold member in a manner to cause a gradually rising level thereof to impregnate the reinforcement with the plastic material progressively upwardly from the lower to the upper end of the space, while permitting air bubbles to rise from the reinforcement through the liquid plastic material.

Preferably, the plastic material is added to reinforcement in the space in a liquid state, and the temperature of the plastic and rate of application of the pressure medium are so controlled as to cause at least a portion of the impregnated reinforcement beneath the rising level of pressure medium to harden and partially cure. In this manner, compensation may be made for the differences in pressure between the upper and lower ends of the space which might otherwise be excessive in the lower end of the annular space. Upon completion of impregnation, the plastic material may be raised to a desired temperature for further curing, and then cooled to permit removal of the formed body from the mold members.

In accordance with further novel concepts of this invention in the formation of hollow bodies, the outer mold member is relatively rigid and has an inner cavity which defines the outer contour of the body to be formed, while the inner mold member is hollow and flexible into an expanded shape approximating that of the interior of such body for receiving the pressure medium. Upon forming of the body, the pressure medium may be removed from the inner mold member and the latter from the formed body, preferably in its original form.

More particularly, this invention may be practiced in the formation of hollow bodies having restricted neck portions by the provision of an inner mold member which may be flexed into a shape for passage through the neck of an outer mold member shaped to accommodate such a body as well as the restricted neck of the formed body itself. Still further, hollow bodies, such as fan blades, having leading and trailing edges, may be formed in accordance with this invention with an inner mold member having a specially constructed expander device for forcing the reinforcement and plastic material into such leading and trailing edges within the annular space.

The temperature of the plastic material during impregnation as well as curing and cooling is maintained at the desired level by direct control over the temperature of the pressure medium. In this manner, heating coils and the like in the outer mold member are not required. Further, with the use of a medium such as mercury having good thermal conduction and low specific heat, the outer mold members may be made of reinforced plastic material without danger of damage thereto.

Although this invention may be practiced in the formation of relatively flat and dish-shaped curved bodies, it finds its most difficult application in the formation of hollow bodies and has been so shown in the illustrative embodiment to be described hereinafter. Thus, there is shown in Fig. 1 a section 20 of a multipart outer mold member which, as previously mentioned, is preferably made of a reinforced plastic material. This section 20 is adapted to be secured to additional sections 21 and 22, as shown in Figs. 6 and 7, to provide an inner cavity which defines the outer contour of the hollow reinforced plastic body to be formed, such body being indicated at 23 in Fig. 11. The mold sections are securable together in the manner mentioned by means of flanged portions 24 having openings 25 (Fig. 1) therethrough to accommodate fastening bolts 26 or the like (Figs. 6 and 7).

As can be seen from Fig. 11, the body 23 to be formed in the illustrative embodiment of this invention is hollow and includes a neck portion 27 which is restricted relative to a lateral dimension of the remaining portion of the body, such as at the corner 28. The inner cavity of the outer mold member is constructed accordingly and, as will be appreciated from the drawings, the hollow body to be formed is a fan blade wherein the lateral dimension at corner 28 constitutes the widest chord thereof and the neck portion 27 a part which is attachable to a hub. It will also be noted that the parting line beween mold sections 20 and 21 and 22 is along leading and trailing edges of the body to be formed.

Adapted to be disposed within the outer mold member is an inner flexible mold member shown in Fig. 3 as comprising a flexible bag 29 expandable into approximately the shape of the interior of the body to be formed and a device 30 for partially expanding the bag into such shape. With the mold members so disposed an annular space is provided therebetween to contain the material to be molded. The open neck of the bag permits it to be filled with a pressure medium in a manner to fully expand the same and thereby cause the reinforcing material to be impregnated with the plastic material.

The reinforcing material may comprise any suitable substance normally used in reinforced plastic bodies, such as fiber glass, nylon, polyester, Teflon or the like, in cloth, strand or mat form. For purposes of this invention, fiber glass in cloth form is preferred. Furthermore, metal or molded plastic inserts may be added with the fiber glass or other suitable material for strengthening the body as well as providing a base to receive attachments, and the use of such inserts is contemplated within the terminology "reinforcement" and "reinforcing material."

Preferably, the reinforcing material is impregnated by a plastic material which includes epoxy resin, although polyester resins may also be used. Although the relative proportions of reinforcement and plastic material will vary according to the particular materials used, and further are within the skill of one skilled in the art, it is contemplated that the reinforcement normally will constitute approximately 60 percent by weight of the molded body.

Turning now to the preferred manner of containing the reinforcement and plastic within the annular space between the inner and outer mold members, a layer 31 of reinforcing material comprising one or more laminations of fiber glass cloth may be laid upon the inner cavity of outer mold member section 20 which has been treated with a suitable parting agent. As shown in Fig. 1, this layer is cut substantially symmetrically of, although larger than, the outer extremities of the inner cavity, so that when it is caused to conform to the cavity, as shown in Fig. 2, outer edges 31a will project beyond such extremities. At this time, the expander device 30 of the inner mold member is inserted within the bag which has also been treated with a parting agent, so as to expand the bag into substantially the shape of the interior of the body to be formed, as can be seen from Fig. 4. Although a detailed description of the device 30 and its insertion within the bag 29 will follow, it is sufficient to note at this time that the partially expanded inner mold member is now placed upon the layer of reinforcement 31 symmetrically of the inner cavity of mold member section 20, as shown in Fig. 4.

Another layer of reinforcement 32, also symmetrical to the outer extremities of the inner cavity of mold member section 20, but in this case slightly smaller, is laid upon the inner mold member above the lower layer of reinforcement and the outwardly extending edges 31a of lower layer 31 are folded over the outer edges thereof, as shown in Fig. 5. It will be understood in this connection that the partially expanded inner mold member serves to preshape the reinforcement within the annular space.

The additional outer mold member sections 21 and 22 are now placed over the layers of reinforcing material and secured to the section 20 in a manner to contain such material in an annular space between the inner mold member and the inner cavity of the outer mold member. Preferably, the outer mold member is made up of three sections, as illustrated, such that one of the sections 21 and 22 may be moved into position over the flange of section 20 substantially laterally thereof to prevent the reinforcing material at either the leading or trailing edge of the body from being pinched between the abutting flanges of the outer mold member sections. Upon securement of the above-mentioned sections together the third section is also moved into place laterally of section 20 such that it may be secured thereto without pinching the reinforcement at the other of the leading and trailing edge.

Of course, the laminations of reinforcing material in each layer will depend upon the desired strength of the body to be molded; and the layers may be of uniform thickness or, if desired, heavier in some localized areas. Furthermore, it may be found that folding of the edges 31a of reinforcing layer 31 about upper layer 32 is facilitated by cutting or crimping layer 31 at or adjacent its corners.

Plastic material is now added to the annular space between the mold members in which the reinforcing material is contained. In accordance with the preferred embodiment of this invention, the mold members are disposed upright, as shown in Fig. 7, such that the plastic material may be added through the open neck of the outer mold to form a pool in the lower end of the annular space. For this purpose, the plastic material in liquid form is poured through a funnel (shown in phantom in Fig. 7) and a vertically extending conduit 33 disposed within the annular space and having its lower end adjacent the bottom thereof such that the liquid is discharged without excessive agitation which might otherwise create air bubbles within the reinforcement.

As to be described more fully hereinafter in connection with certain exemplary practices of this invention, a hardener or catalyst may be added to the resin prior to its disposal within the annular space for the purpose of accelerating curing thereof in a desired manner. Furthermore, the liquid resin may be warmed to reduce its viscosity such that the pool thereof in the lower end of the annular space will quickly impregnate the reinforcement and air bubbles will not be trapped therein. Saturation or impregnation of the reinforcement with the plastic material in the leading and trailing edges of the body is facilitated by the exertion of a force on the bag 29 of the inner mold member at such edges. For this purpose, and as will be understood more fully in connection with a detailed description of the device 30, the expander device may be rotated in a counterclockwise direction, as seen from Fig. 6, so that its outer ends are further expanded from the position of such figure.

At this time, a pressure medium is caused to be impressed upon the flexible inner mold member in a manner to impregnate the reinforcement with the plastic material progressively from the lower to the upper end of the annular space. For this purpose, and in accordance with the preferred embodiment of the present invention, the pressure medium comprises a liquid metallic substance such as mercury having a high specific weight and a low melting point, although other substances such as a bismuth-lead-tin and cadmium alloy may be found suitable. Thus, the flexible bag 29 is filled by the introduction of mercury into the bottom thereof so that a rising level of the mercury gradually expands the bag in an upwardly direction, as best shown in the lower portion of Fig. 8. The mercury may be introduced through the hollow tubular shaft 34 of the expander device 30 from a suitable source, as indicated at 35 in Fig. 9.

As also shown in Fig. 9, there is provided a system for circulating the mercury or other pressure medium between the source 35 and interior of the bag 29. This system includes a first conduit 35a having a lower end which extends into the neck of the bag and an opposite end which may be connected to a suitable conductor shown diagrammatically at 36. The system also includes a conduit 37 coupled at one end to the upper end of expander device shaft 34 and connected at its opposite end with a heat exchanger 38 which is disposed in a conductor 39. In addition to the function to be described, the connection of conduit 37 with shaft 34 serves to hold the device 30 in the expanded position previously mentioned for forcing the plastic and reinforcing material in the leading and trailing edges of the body.

As further shown in Fig. 9, conductors 36 and 37 are connected to a common line 40 leading to the source of supply 35 of mercury or other pressure medium. Thus, with suitable valves 41 and 42 disposed in conductors 36 and 40, respectively, the line leading to conduit 35a may be closed by valve 41 and mercury pumped by pump 43 in conductor 39 through open valve 42 and heat exchanger 38 into the bag 29. Upon closing of valve 42 and opening of valve 41, the pressure medium may be circulated within the bag and through the heat exchanger 38 for heating or cooling the medium within the bag, as desired. Obviously, the bag may be emptied of pressure medium by closing of the valve 41, opening of valve 42 and reversal of pump 43 in the manner indicated diagrammatically.

The above-described apparatus provides a means for directly heating and cooling the mercury whereby the temperature of the plastic material may be maintained at a desired level during the molding, curing and cooling without the use of heating coils and the like within the outer mold member. Particularly, the pressure medium is initially applied to the bag for filling same at such a temperature that the plastic material in the annular space above such level is maintained at a temperature best suited for impregnating the reinforcement and sufficiently liquid to permit air bubbles to pass or rise upwardly from the impregnated portion of the reinforcement beneath the pressure medium level. Furthermore, the pressure medium is introduced at such a rate that its level rises gradually in a manner to permit the escape of air bubbles in the manner previously mentioned. Furthermore, it is contemplated that the mercury will be applied at a temperature such that the plastic material beneath its rising level which has already impregnated the reinforcement will be caused to harden and at least partially cure while the remaining portion of the plastic material above the rising level is impregnating further the reinforcement. As previously mentioned, this control will compensate for the possibility of the head of pressure medium within the bag 29 becoming high enough to exert excessive impregnating force upon the plastic within the lower end of the bag. Of course, after filling of the bag and impregnation of the reinforcement with plastic material, the mercury may be further heated for the purpose of curing the molded body to an extent desired.

It will be understood to those skilled in the art that this invention permits such factors as the temperature and rate of application of the mercury to be controlled in a manner which will vary from one plastic composition to another. However, it is believed that the determination of such factors to accomplish the purposes of this invention are within the realm of one skilled in the art. The following examples will illustrate the manner in which these controls are exercised in the practice of this invention:

Example No. 1

Plastic material of the following composition is added at room temperature to fiber glass reinforcement within the annular space of the mold:

|  | Parts |
|---|---|
| Polyester resin—American Cyanamid, 4111 | 100 |
| Promoter—Nuolate Cobalt | .5 |
| Catalyst—Lupersol DDM | .5 |

After mixing with the catalyst, this resin will not begin to gel for about 45 minutes, such that ample time is allowed for gradually filling the bag 29 to permit air bubbles to escape from the reinforcement. Mercury may be added at 80° F., although if more time is required in filling the bag, the gelling time of the resin may be almost doubled by addition of the mercury at about 70° F.

Although the resin will cure completely without heating, curing may be speeded up by heating the mercury after the bag is filled, as previously mentioned. Thus, if the mercury were to be heated to 90° F., curing would be sufficient in 20 minutes to permit removal of the molded body from the mold. Complete cure may be obtained at room temperature.

Example No. 2

Plastic material containing the following ingredients was warmed to 100° F. and then placed in the annular space between the inner and outer mold members:

|  | Parts |
|---|---|
| Epoxy Resin—Shell Epon 828 | 100 |
| Curing agent—Shell "Z" | 24 |

Mercury at about 125° F. was then added to the bag which allowed about 45 minutes for filling before any danger of the resin becoming too viscous to suitably saturate the reinforcing material. If less time were required, a higher mercury temperature may be used.

For the purpose of curing, the mercury in the filled bag is heated to about 180° or 200° F. for approximately 30 minutes and then cooled to 120° F. before removal of the mercury from the bag and the molded body from the mold members. Post cure of the molded body in an oven at 350° is necessary to give it maximum strength.

Example No. 3

In this case, a plastic material containing the following ingredients is used:

|  | Parts |
|---|---|
| Epoxy resin—Bakelite ERL 3794 | 100 |
| Hardener—Methylene Dianiline | 28½ |

This hardener is a granular solid and must be heated to 185° F. to melt it. The resin is heated to 165° F. before mixing with the hardener, and the mixture is then cooled to 130° F. before placement in the annular space of the mold.

Mercury is applied to the flexible bag at 150° F. to keep the resin fluid as the viscosity of the mixture becomes too high for good impregnation if allowed to cool before 125° F. Under these conditions, about one hour may be used to fill the bag and impregnate the reinforcing material. Upon filling of the bag, the mercury is heated to 190° to 200° F. for about 30 minutes, and then cooled to 125° to permit removal of the bag from the molded body and the molded body from the mold members. Post curing at 350° F. for four hours is required to finish the curing cycle.

Example No. 4

A plastic material containing the following ingredients is placed in the annular space of the mold at about 100° F.:

|  | Parts |
|---|---|
| Polyester resin—Hooker Electrochemical Co., Hetron 92 | 100 |
| Catalyst—Luperco ATC | 2 |

The bag is then filled with mercury at about the same temperature. Inasmuch as this hardener or catalyst requires a temperature above 120° F. in order to cure, unlimited time is allowed for filling the bag in a gradual manner to impregnate the reinforcing material. Upon filling, however, the mercury may be heated 200° F. and the resin thus cured in less than five minutes. Only slight cooling is then necessary to permit removal of the molded body.

As previously mentioned, the use of the mercury or similar substance for controlling the temperature of the plastic material not only eliminates the need for heating coils in the outer mold member but also permits the outer mold member to be made of reinforced plastic. That is, with a circulating system of the type shown diagrammatically and previously described, the heated mercury may be quickly cooled without removal from the inner mold member such that even if the temperatures becomes excessive, they will be of short duration. It will also be understood that substantially similar results can be obtained with the use of immersion type heating elements in the mercury. Still further, the mercury may act as a coolant and eliminate the danger of exothermic heat from the resins.

Inasmuch as the plastic mold member is translucent, the progressive impregnation of the plastic material within the reinforcement may be observed externally of the mold. This is particularly advantageous in connection with the present invention inasmuch as it permits the operator to be assured that the plastic is impregnating the reinforcement substantially evenly such that the air bubbles are being driven out. On the other hand, if the impregnation is uneven, as will be indicated by the level of the resin, the operator knows that the rate of application of the pressure medium is to fast and that air bubbles are being trapped within the reinforcement.

It is still further preferred that the plastic material be added in an excess of that required for molding the body so that air bubbles which are permitted to escape from the impregnated reinforcement will pass into this excess. For this purpose, the restricted neck portions of the inner and outer mold members are made longer than that required for molding the restricted neck 27 (see Fig. 11) of the body 23 to be formed. Adjacent this extended length of the neck portion of the outer mold member is an outlet to which an overflow pipe 44 is connected. Thus, the excess resin forced upwardly in the annular space by the rising level of mercury will pass into the annular space between the extended neck portions of the inner and outer mold members and outwardly of such annular space through the pipe 44. It is also contemplated that this extended annular space may be filled with a wick 45 of reinforcing material for impregnation by excess resin.

Upon molding and curing of the body in the manner desired, and further upon cooling of the body and removal of the mold members therefrom, the excess material may be removed from the body 23, as illustrated by the cut-off portion 46 shown in Fig. 11. As can be seen from the broken lines within the part 46, this excess includes a reinforced plastic portion having a substantially conical taper due to the wick 45.

In practicing this invention, very high pressures may, if desired, be exerted upon the material within the annular space between the mold members by the use of a very small diameter stand pipe in which the height of the mercury may be controlled. On the other hand, in the molding of very long objects, it may be found that the variation in head of the pressure medium between the upper and lower ends of the mold members is too great. In such a case, this variation may be minimized by disposing the mold in a somewhat reclined position. Thus, although the plastic material would still be caused to impregnate the reinforcement by the rising level of a pressure medium, the difference in head of the mercury between the upper and lower ends of the flexible bag would be substantially reduced.

Referring now to the details of the inner mold member which is shown in the exploded view of Fig. 3, the bag 29 may be made of rubber or a suitable plastic material and sufficiently thin to permit it to be easily flexed into the positions to be described. The expander device or mandrel 30 for partially expanding the bag includes, in addition to the hollow shaft 34, a pair of flaps 47 and 48 secured along diametrically opposed lengths thereof. As can be seen from Fig. 3, these flaps have outer edges which conform in contour approximately to the shape of the bag 29 so that when fully extended they will exert a force thereon. However, these flaps are made of a flexible material, such as canvas duck reinforced neoprene diaphragm sheet, so that they may be wrapped around the shaft 34 to the position shown in Fig. 10. In this latter retracted position, the flaps 47 and 48 may be passed through the restricted neck portion of the bag 29.

Thus, the device 30 is initially manipulated to retract the flaps into their position for wrapping around the shaft 34 such that they may be extended into the bag 29. When disposed within the bag, the flaps 47 and 48 may be caused to partially expand the flexible bag 29 by rotation of the handle portion of the shaft 34 above the flaps which extends outwardly from the open neck of the bag, as shown in Figs. 7 to 9. When so expanded, upon rotation of the shaft in a counterclockwise position as viewed from Fig. 4, the outer ends of the flaps will abut against the leading and trailing edges of the bag so as to cause it to at least partially expand and serve to shape the reinforcing material thereabout. When, however, the plastic material has been added to the annular space between the mold members and it is desired to force the leading and trailing edges of the bag into the reinforced plastic material to promote the impregnation thereof, the shaft 34 may be further rotated for fully extending the outer contours of the flaps and thereby causing them to exert forces upon the leading and trailing edges of the bag. As previously mentioned, the device 30 may be secured in this position by connection of the upper end of the shaft 34 to the conduit 37, as shown in Fig. 9.

Upon removal of the outer mold member from the body 23, the inner mold member may be removed from within such body by rotating the shaft 34 in a clockwise direction, as seen in Fig. 4, so as to wrap the flaps about the shaft 34 to the position shown in Fig. 10 such that the shaft and flaps comprising the device 30 may be removed through the upper neck of the bag 29. Upon removal of the device 30 therefrom, the bag 29 may in turn be flexed into a position for removal from the interior of the molded body through its restricted neck portion.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a method of forming a hollow reinforced plastic body, the steps of disposing a hollow flexible mold member within a relatively rigid outer mold member having an inner cavity corresponding to the outer contour of said body to provide a substantially upright space therebetween which is vented at its upper end, containing the reinforcement within the space and a liquid plastic material in a pool at the lower end of the space, and gradually filling the flexible mold member with a rising level of mercury to progressively impregnate the reinforcement with the plastic material to form the body with only the pressure due to the head of the mercury while permitting air bubbles within the reinforcement to rise within the space and escape through the vented upper end thereof.

2. In a method of the character defined in claim 1, wherein the plastic material is thermosetting and including the step of adding heat to the mercury to harden a portion of said liquid plastic material beneath the rising level of the mercury during such impregnation.

3. In a method of forming a hollow reinforced plastic body, the steps of containing the reinforcement in a space between a hollow flexible mold member and a relatively rigid outer mold member having an inner cavity corresponding to the outer contour of said body and a liquid plastic material in a pool at the lower end of the space, arranging the mold members to dispose the space substantially upright and with its upper end vented, and gradually filling the flexible mold member with a rising level of mercury to progressively impregnate the reinforcement with the plastic material to form the body with only the pressure due to the head of the mercury while permitting air bubbles within the reinforcement to rise within and escape from the vented upper end of the space.

4. In a method of the character defined in claim 3, including the step of heating the mercury while it is within the hollow mold member to initiate a reaction in the plastic material and then removing heat from the mercury to absorb exothermic heat of the liquid plastic material.

5. In a method of forming a hollow reinforced plastic body having leading and trailing edges intermediate its opposite ends, the steps of disposing the reinforcement in a space between a flexible hollow bag and a relatively rigid outer mold member having an inner cavity corresponding to the outer contour of such body, applying force to the edges of the bag to expand same into approximately the shape of the interior of the body to be formed, arranging the outer mold member and bag to dispose the space therebetween substantially upright and with its upper end vented, introducing a liquid plastic material into the lower end of the space, and then gradually filling the bag with mercury to progressively impregnate the reinforcement with the plastic material from the lower to the upper end of the space while permitting air bubbles with the reinforcement to escape through the vented upper end of the space.

6. In a method of forming a hollow reinforced plastic body such as a fan blade or the like having a restricted neck at one end and leading and trailing edges intermediate its ends, the steps of providing a flexible bag having an expanded shape approximately that of the interior of the body to be formed, introducing an expander device into the bag and manipulating same to apply force to the leading and trailing edges of the bag to at least partially expand same, disposing the reinforcement in a space between the partially expanded bag and a relatively rigid outer mold member having an inner cavity corresponding to the outer contour of said body about the reinforcement, further manipulating the expander device to apply additional force to the leading and trailing edges of the bag to further expand same, arranging the outer mold member and bag to dispose the space therebetween substantially upright and with a vented end of the space uppermost, introducing a liquid plastic material into the lower end of the space, and gradually filling the bag with mercury to progressively impregnate the reinforcement with the plastic material from the lower to the upper end of the space while permitting air bubbles within the reinforcement to escape from the vented upper end, and then removing the expander device from within the bag.

7. In a method of forming a hollow reinforced plastic body, the steps of disposing the reinforcement in a space between a flexible hollow bag and a relatively rigid outer mold member having an inner cavity corresponding to the outer contour of such body, applying force to the bag to expand same into approximately the shape of the interior of the body to be formed, arranging the outer mold member and bag to dispose the space therebetween substantially upright and with its upper end vented, introducing a liquid plastic material into the lower end of the space, and then gradually filling the bag with mercury to progressively impregnate the reinforcement with the plastic material from the lower to the upper end of the space while permitting air bubbles with the reinforcement to escape through the vented upper end of the space.

8. In a method of forming a hollow reinforced plastic body, the steps of providing a flexible bag having an expanded shape approximately that of the interior of the body to be formed, introducing an expander device into the bag and manipulating same to apply force to the bag to at least partially expand same, disposing the reinforcement in space between the partially expanded bag and a relatively rigid outer mold member having an inner cavity corresponding to the outer contour of said body about the reinforcement, further manipulating the expander device to apply additional force to the bag to further expand same, arranging the outer mold member and bag to dispose the space therebetween substantially upright and with a vented end of the space uppermost, introducing a liquid plastic material into the lower end of the space, and gradually filling the bag with mercury to progressively impregnate the reinforcement with the plastic material from the lower to the upper end of the space while permitting air bubbles within the reinforcement to escape from the vented upper end, and then removing the expander device from within the bag.

References Cited in the file of this patent

UNITED STATES PATENTS

| Number | Name | Date |
|---|---|---|
| 1,607,384 | Ball | Nov. 16, 1926 |
| 2,028,808 | Rosenthal | Jan. 28, 1936 |
| 2,202,042 | Blount | May 28, 1940 |
| 2,238,833 | Tillotson | Apr. 15, 1941 |
| 2,388,776 | Wallace | Nov. 13, 1945 |
| 2,456,513 | Johnson | Dec. 14, 1948 |
| 2,495,640 | Muskat | Jan. 24, 1950 |
| 2,613,397 | Borkland | Oct. 14, 1952 |
| 2,631,955 | Muskat | Mar. 17, 1953 |
| 2,644,198 | Crawford | July 7, 1953 |
| 2,750,629 | Baudon | June 19, 1956 |
| 2,815,534 | Ising et al. | Dec. 10, 1957 |